Patented May 12, 1931

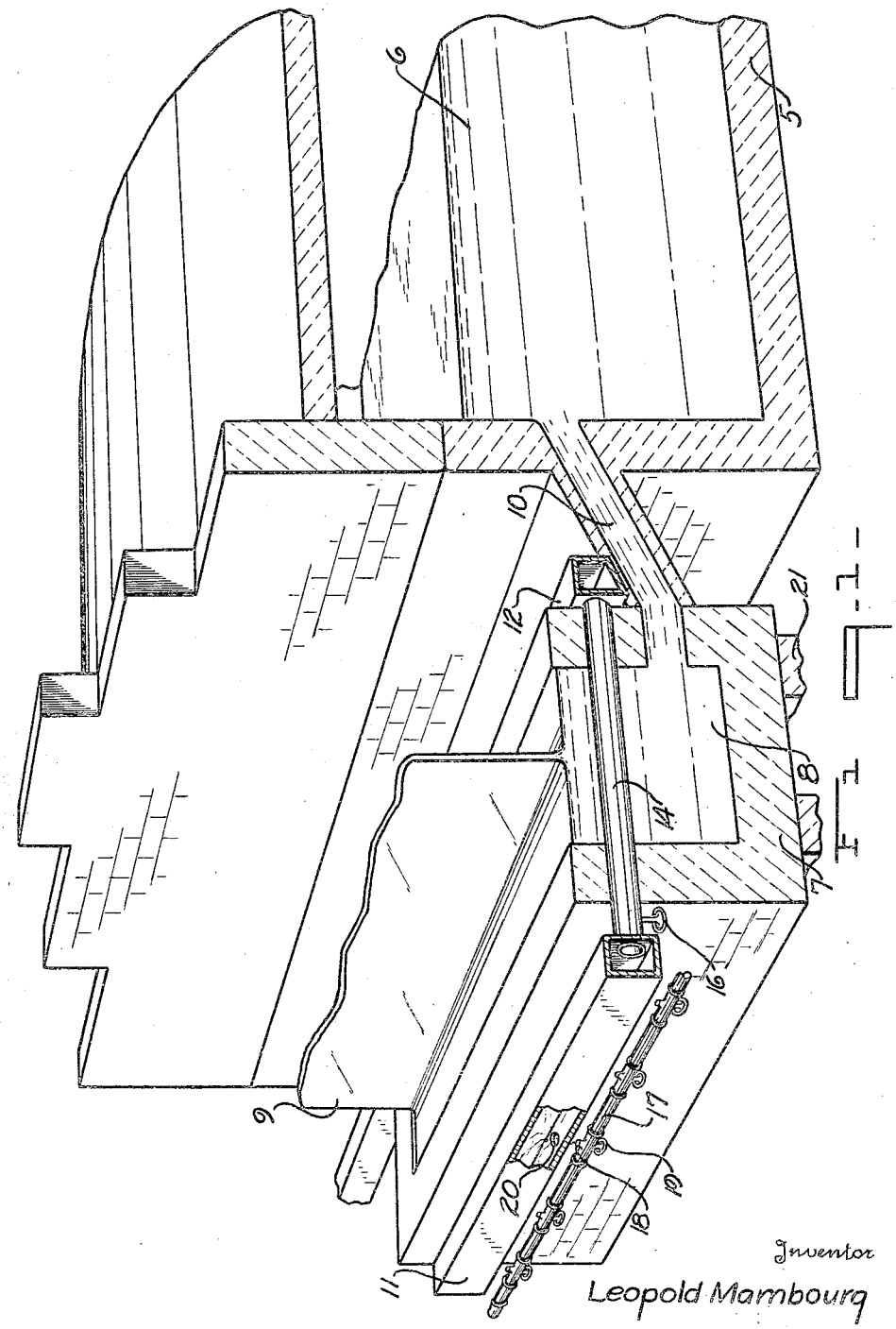

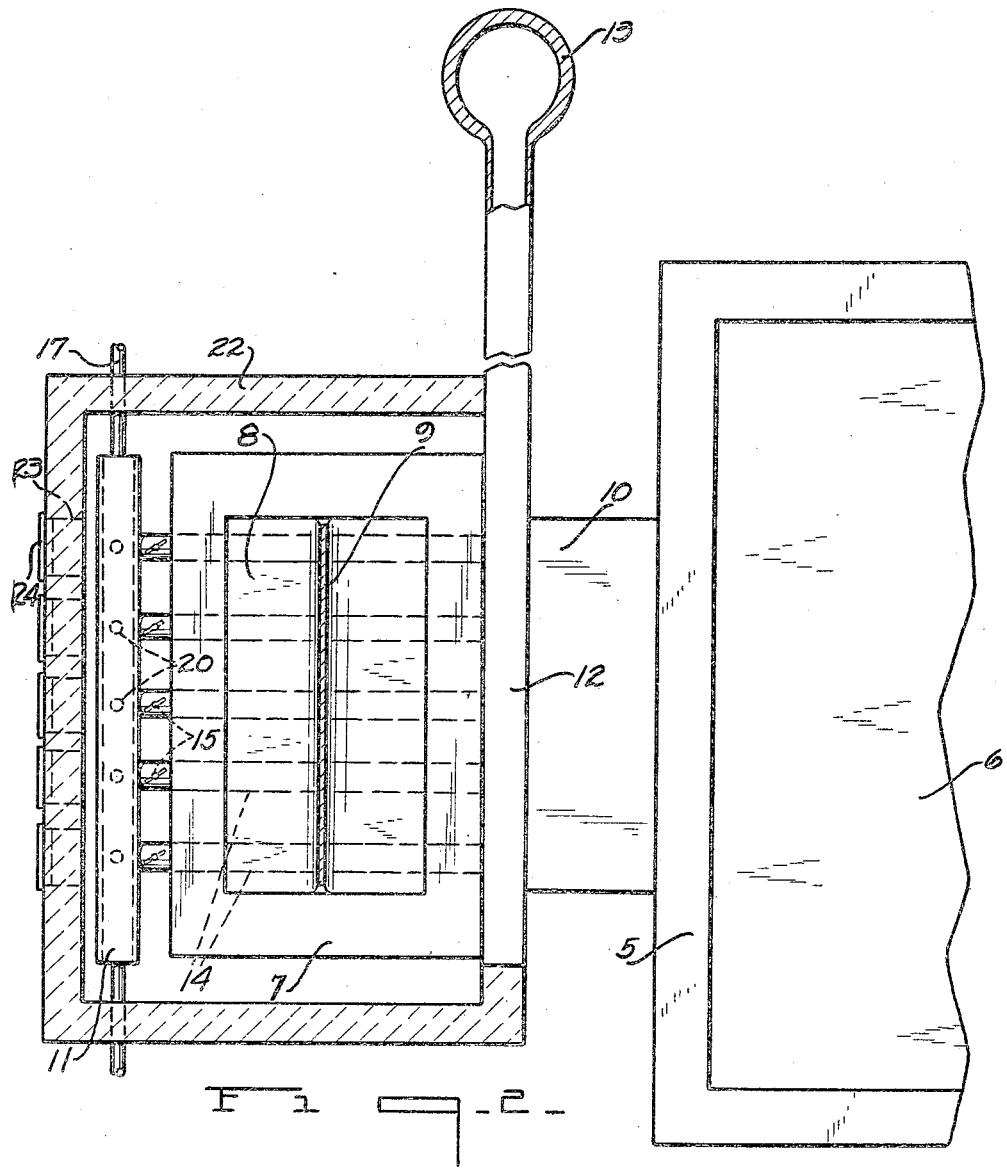

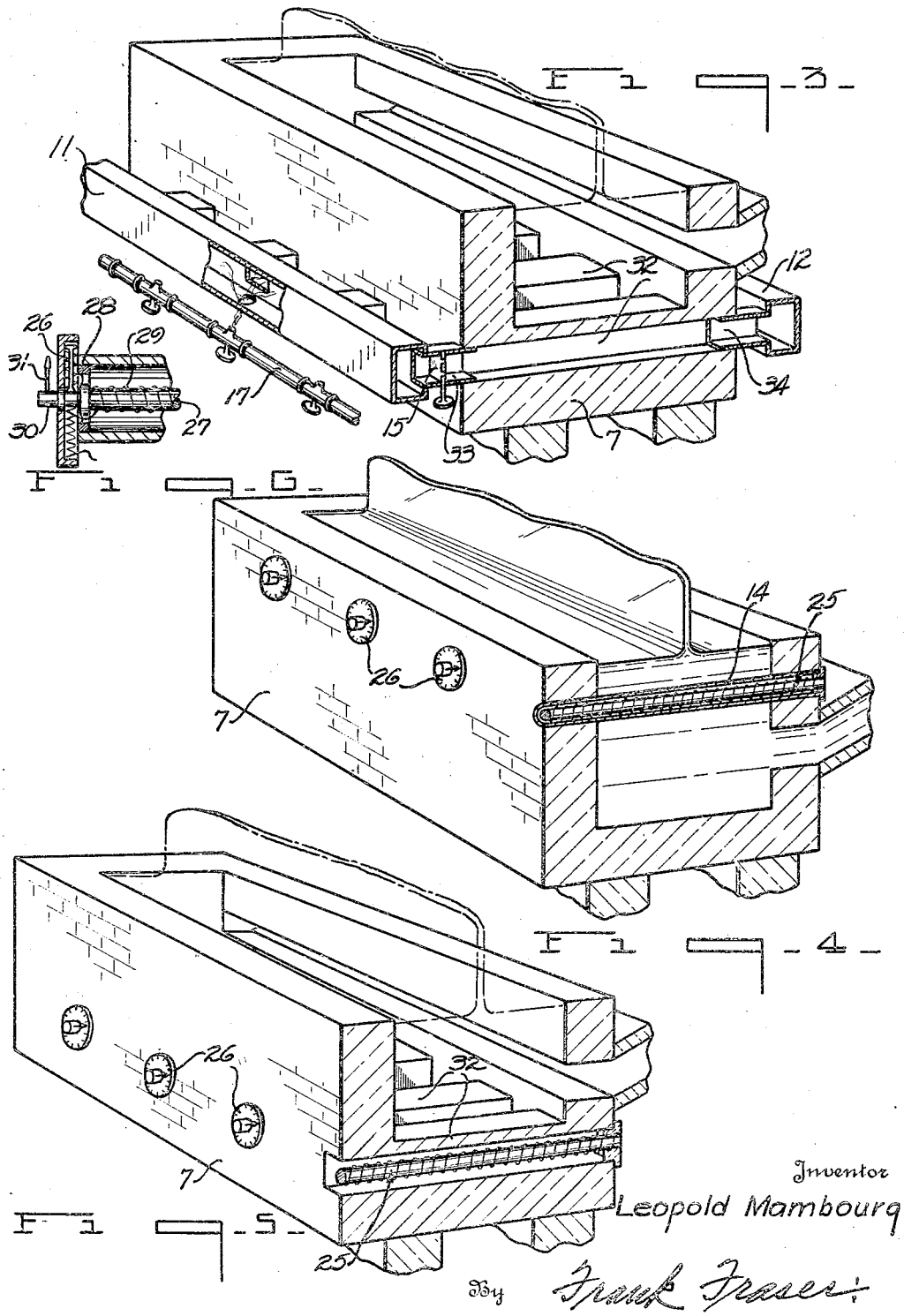

1,805,218

UNITED STATES PATENT OFFICE

LEOPOLD MAMBOURG, OF LANCASTER, OHIO, ASSIGNOR TO LIBBEY-OWENS-FORD GLASS COMPANY, OF TOLEDO, OHIO, A CORPORATION OF OHIO

TEMPERATURE CONTROL MEANS FOR MOLTEN GLASS

Application filed April 5, 1928. Serial No. 267,529.

This invention relates to improvements in the manufacture of sheet glass and more particularly to an improved system for controlling the temperature of the molten bath from which the sheet is formed.

One of the principal objects of the present invention is to render possible the drawing of a sheet of glass of relatively great width or of greater width than has heretofore been customary while at the same time maintaining the sheet of a high quality and uniformly good throughout. One of the problems usually encountered in the production of a relatively wide sheet of glass has been the difficulty of maintaining the pool of molten glass in the drawing chamber, and from which the sheet is formed, at a uniform temperature throughout the width of said sheet. The present invention aims to provide an improved system for maintaining the pool of molten glass in the drawing chamber at a substantially uniform temperature throughout whereby to facilitate and improve the drawing of the sheet therefrom.

Also, according to the present invention, means is preferably provided for accurately controlling the supply of heat to different portions of the drawing chamber or pot to the end that a greater amount of heat can be supplied to the glass having a tendency to cool rather quickly and a lesser amount of heat supplied to the normally hotter glass whereby to substantially equalize the temperature of the glass throughout the entire drawing chamber. It is a well known fact that the molten glass in the center of a drawing chamber or other receptacle is usually somewhat hotter than the glass at the sides thereof, this being due to the contact between the border portions of the molten glass and the side walls of the drawing chamber or receptacle.

Other objects and advantages of the invention will become more apparent during the course of the following description when taken in connection with the accompanying drawings.

In the drawings forming a part of this application and wherein like numerals are employed to designate like parts throughout the same, Fig. 1 is a perspective sectional view of apparatus constructed in accordance with the present invention, Fig. 2 is a top plan view thereof, Figs. 3, 4 and 5 are perspective sectional views showing modified forms of the present invention, and Fig. 6 is a detail section showing the mounting and control for the electric heating elements.

Referring now to the drawings and especially to Figs. 1 and 2, the numeral 5 indicates a glass melting furnace which may or may not be of the continuous tank type as desired. If such a tank furnace is used, however, the molten glass 6 will be first produced in the melting end thereof, not here shown but being to the right of Fig. 1, after which this glass will flow slowly through the refining and settling portions of the furnace to the exit end thereof. Associated with the exit or discharge end of the furnace is a relatively shallow drawing chamber or draw pot 7 containing the pool of molten glass 8 from the surface of which the glass sheet 9 is adapted to be drawn upwardly. This sheet may be continued vertically and annealed while traveling in a generally vertical direction or the same may be deflected about a suitable bending member or roll and passed horizontally through an annealing leer as preferred. It will be noted that the drawing chamber 7 is elongated and that the sheet source or line of generation of the sheet extends longitudinally thereof. Thus, the width of sheet drawn is adapted to be substantially the length of the drawing chamber used.

In the installation herein disclosed the drawing chamber or draw pot 7 is positioned so that the glass level of the pool 8 will be considerably below the glass level in the furnace 5, the glass being caused to flow from the furnace into said chamber through the downwardly inclined passage 10 which extends substantially the entire width of the drawing chamber as shown in Fig. 2. It will be noted that the passage 10 communicates with the furnace beneath the level of the molten glass 6 and also enters the chamber 7 beneath the level of the molten glass therein and in fact closely adjacent the bottom thereof. The supply of molten glass drawn from the tank or furnace is thus taken from a location considerably below the glass level in said furnace thus necessitating a deeper flow of glass therethrough. Also, the fact that the pool 8 from which the sheet is drawn is positioned below the glass level in the furnace insures a constant head of glass to supply the pool 8 and further insures a constant glass level in this pool regardless of the intermittent feeding operations at the melting end of the furnace. The drawing chamber 7 may be supported, if desired, upon stools or the like 21 and completely or partially surrounded by means of a heating chamber 22 heated in any suitable manner.

Extending longitudinally along opposite sides of the drawing chamber are the inlet and exhaust manifolds or headers 11 and 12 respectively, the exhaust manifold or header communicating at one end with a stack or the like 13. Extending between and communicating with the inlet and exhaust manifolds are the heat conducting members 14 herein shown as being in the form of hollow cylindrical flues or the like which extend transversely of the drawing chamber and which are submerged within the pool of molten glass 8 beneath the line of generation of the sheet. These flues are positioned at spaced locations longitudinally of the drawing chamber and each is provided adjacent its inlet end with a damper 15 controllable by suitable means 16 whereby to regulate the supply of heat passing therethrough. Arranged preferably beneath and extending longitudinally of the intake manifold 11 is a gas or the like supply pipe 17 provided with a series of nozzles 18 controlled by handles or other suitable means 19. These nozzles are adapted to direct the flames or other heating medium used upwardly into the intake manifold through the openings 20 in the bottom wall thereof.

In the operation of this form of apparatus, the draft of the stack 13 creates or causes a continuous circulation of a gaseous fluid such as for example air through the flues 14, this air being drawn in through the openings 20 in the intake manifold 11 and subsequently passed outwardly through the exhaust manifold 12 to stack 13. It will be apparent that the flames or other heating medium injected into the intake manifold will serve to heat the air passing therethrough to the flues. The heated air passing through the flues 14 will serve to heat the adjacent molten glass in the drawing chamber and the dampers 15 can be so adjusted that only the desired amount of heat will pass through each flue to the end that a greater or less amount of heat may be supplied to one flue independently of the others. In this way, a greater amount of heat can be supplied to the molten glass where there is a tendency for it to cool rather quickly such as at the opposite ends of the drawing chamber and a less amount of heat can be supplied to the naturally hotter molten glass for example in the center of the drawing chamber. Thus, by properly regulating the dampers 15 it is possible to maintain the glass within the drawing chamber at a substantially uniform temperature throughout whereby to render possible the drawing of a relatively wide sheet. The drawing chamber 7 can be made as long as desired depending upon the width of sheet to be drawn. The front wall of the heating chamber 22 surrounding the drawing chamber is preferably provided with a plurality of openings 23 so that ready access may be had to the control means 16 and 19 for the dampers 15 and nozzles 18 respectively. The openings 23 may be normally closed by suitable closures 24.

The inventive idea herein expressed may take a variety of mechanical expressions and is not limited to any particular kind, shape or size of drawing chamber or receptacle. In its broad aspect, this invention consists in the provision of means for controlling and maintaining a pool of molten glass at a desired substantially uniform temperature. Further, the invention is not to be restricted to the particular type of heat conducting members shown in Figs. 1 and 2 nor to the particular heating means disclosed therein. For example, the hollow members or flues 14 may have arranged therein suitable electrical heating elements 25 as shown in Fig. 4, said heating elements being individually controlled by means of separate rheostats 26. As shown particularly in Fig. 6, each electrical heating element may comprise a core 27 secured at its opposite ends within fixed blocks 28 formed of some suitable insulating material. Each core has wound thereabout an electric resistance wire 29 having connection with the corresponding rheostat 26. The outer face of each rheostat is preferably graduated as shown in Fig. 4 and carried by the operating shaft 30 thereof is an indicating pointer 31 adapted to cooperate with the graduations on the face of the respective rheostat to indicate the volume of heat being supplied to the glass adjacent the location of the corresponding electrical heating element. By the means just described, the several electrical heating elements can be individually controlled to accomplish the same objects as the heat conducting members 14 of Figs. 1 and 2.

Also, as shown in Fig. 3, the inventive idea may be expressed by eliminating the heat conducting members or flues 14 and forming the bottom of the drawing chamber 7 with a plurality of tunnels 32, said tunnels extending transversely of the drawing chamber at spaced points longitudinally thereof and through which heated air may be circulated in the same manner as the air is circulated through the flues 14 of Figs. 1 and 2. In Fig. 3, the tunnels are connected with the inlet and exhaust manifolds 11 and 12 by means of the hollowing connecting or branch members 33 and 34 respectively. On the other hand, the tunnels 32 may have arranged therein the electrical heating elements 25 as shown in Fig. 5.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. In apparatus for producing sheet glass, a receptacle containing a mass of molten glass from which the sheet is adapted to be formed, a plurality of heat conducting members submerged within the mass of molten glass and extending transversely of the receptacle at spaced locations longitudinally thereof, means for creating a circulation of gaseous fluid through said members, and means for heating the gaseous fluid prior to its passage through said members.

2. In apparatus for producing sheet glass, a receptacle containing a mass of molten glass from which the sheet is adapted to be formed, a plurality of heat conducting members submerged within the mass of molten glass and extending transversely of the receptacle at spaced locations longitudinally thereof, means for creating a circulation of gaseous fluid through said members, means for heating the gaseous fluid prior to its passage through said members, and separate means for controlling the supply of heated gaseous fluid to each individual member.

3. In apparatus for producing sheet glass, a drawing chamber containing a mass of molten glass from which the sheet is adapted to be drawn, a plurality of heat conducting flues submerged within the mass of molten glass and extending transversely of the chamber at spaced locations longitudinally thereof, intake and exhaust manifolds arranged at opposite sides of the drawing chamber and with which the opposite ends of said flues communicate, means for creating a continuous circulation of gaseous fluid through the manifolds and flues, and means associated with the intake manifold for heating the gaseous fluid prior to its passage through said flues.

4. In apparatus for producing sheet glass, a drawing chamber containing a mass of molten glass from which the sheet is adapted to be drawn, a plurality of heat conducting flues submerged within the mass of molten glass and extending transversely of the chamber at spaced locations longitudinally thereof, intake and exhaust manifolds arranged at opposite sides of the drawing chamber and with which the opposite ends of said flues communicate, means for creating a continuous circulation of gaseous fluid through the manifolds and flues, means associated with the intake manifold for heating the gaseous fluid prior to its passage through said flues, and a damper associated with the intake end of each flue for controlling the amount of heated gaseous fluid passing therethrough to the outlet manifold.

5. In apparatus for producing sheet glass, a receptacle containing a mass of molten glass, means for drawing a sheet therefrom, and a heat conducting member submerged within the mass of molten glass beneath the sheet source and extending transversely of the line of generation of said sheet.

6. In apparatus for producing sheet glass, an elongated receptacle containing a mass of molten glass, means for drawing a sheet therefrom, the line of generation of the sheet extending longitudinally of said receptacle, and a plurality of heat conducting members submerged within the mass of molten glass and extending transversely of the receptacle at spaced locations longitudinally thereof, said heat conducting members being arranged beneath the sheet source and also extending transversely of the line of generation of the sheet.

7. In apparatus for producing sheet glass, a receptacle containing a mass of molten glass, means for drawing a sheet upwardly therefrom, a heat conducting member submerged within the mass of molten glass beneath the sheet source and extending transversely of the line of generation of said sheet, a furnace containing a source of molten glass, and a passage leading from the furnace and communicating with said receptacle beneath the heat conducting member so that the glass passes upwardly therebetween.

8. In apparatus for producing sheet glass, an elongated receptacle containing a mass of molten glass, means for drawing a sheet therefrom, the line of generation of the sheet extending longitudinally of the receptacle, a plurality of heat conducting members submerged within the mass of molten glass and extending transversely of the receptacle at spaced locations longitudinally thereof, said heat conducting members being arranged beneath the sheet source and also extending transversely of the line of generation of the sheet, a furnace containing a source of molten glass, and a passage leading from the furnace and communicating with said receptacle beneath the heat conducting members so that the glass passes upwardly therebetween.

Signed at Lancaster, in the county of Fairfield and State of Ohio, this 2nd day of April, 1928.

LEOPOLD MAMBOURG.